March 24, 1942. J. L. VACHER 2,277,172
SEPARABLE FASTENER
Filed Dec. 4, 1940
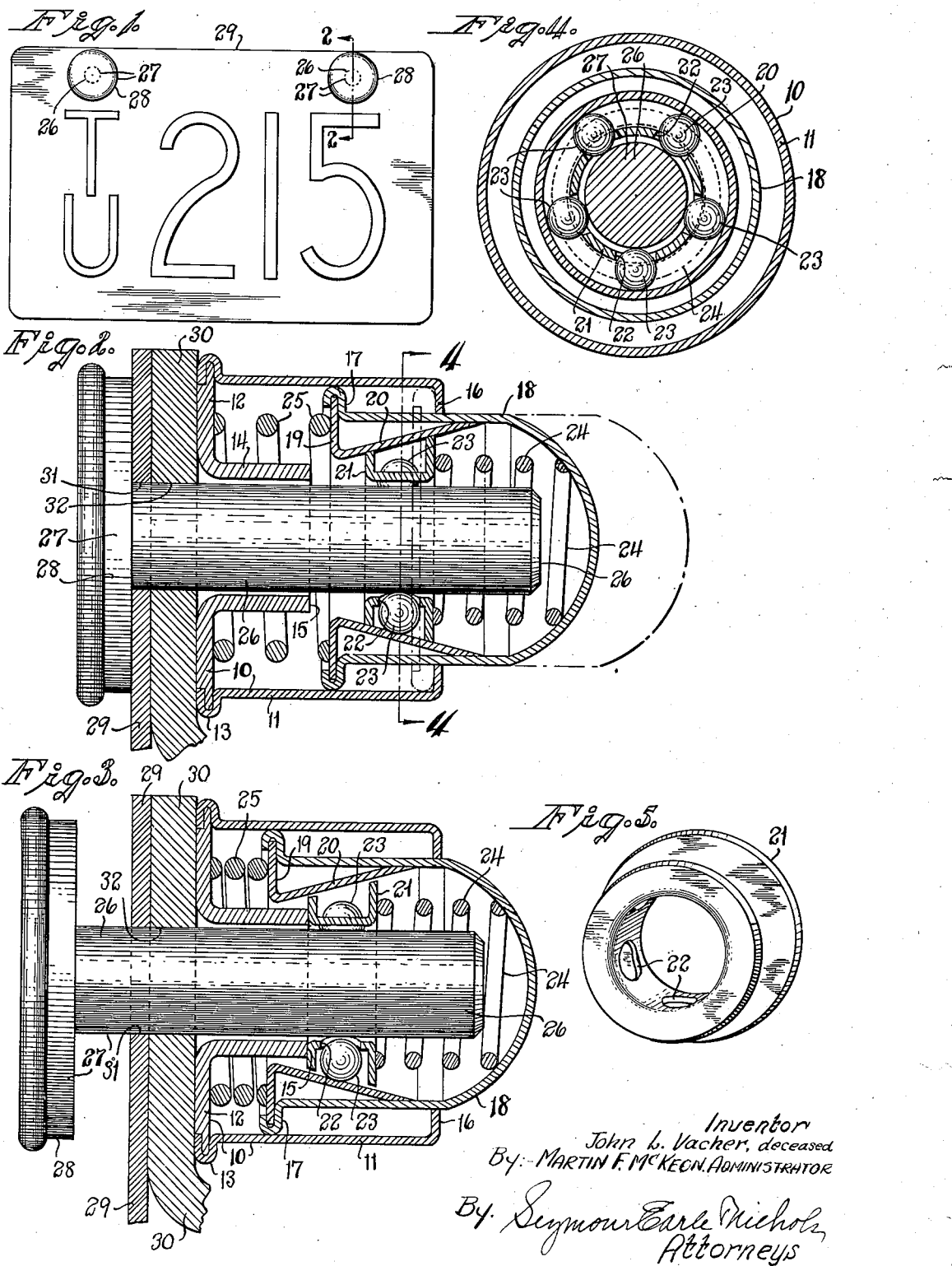
Inventor
John L. Vacher, deceased
By: MARTIN F. McKEON, Administrator
By. Seymour Earle Nichols
Attorneys Patented Mar. 24, 1942

2,277,172

UNITED STATES PATENT OFFICE 2,277,172

SEPARABLE FASTENER

John L. Vacher, deceased, late of Bridgeport, Conn., by Martin F. McKeon, administrator, Bridgeport, Conn., assignor to Madeleine D. Vacher, Bridgeport, Conn.

Application December 4, 1940, Serial No. 368,445

4 Claims. (Cl. 24—211)

The present invention relates to improvements in separable fasteners, and more particularly to improvements in separable fasteners which are adapted for use in holding automobile license plates and the like in place upon vehicles, though available for other uses.

One of the objects of the present invention is to provide a superior separable fastener which will normally hold an object securely in place but the parts of which fastener may be readily separated by a slight movement.

Another object of the present invention is to provide a superior separable fastener which may be readily released by an inward relative telescoping movement between two of the parts or units.

Still another object of the present invention is to provide a superior separable fastener which will apply a constant tension to the element gripped or fastened so as to minimize vibration of the object to be held in place, such, for instance, as minimizing the vibration of the license plate of an automobile.

A still further object of the present invention is to provide a superior separable fastener having automatic take-up means of such character as not to require the user of the separable fastener to exercise great care in the relative adjustment of the parts.

With the above and other objects in view, as will appear to those skilled in the art from the present disclosure, this invention includes all features in the said disclosure which are novel over the prior art.

In the accompanying drawing, in which certain modes of carrying out the present invention are shown for illustrative purposes:

Fig. 1 is a view in front elevation illustrating the holding in place of an automobile license plate by a pair of separable fasteners embodying the present invention;

Fig. 2 is a broken view in central-longitudinal section taken on the line 2—2 of Fig. 1, but on a larger scale;

Fig. 3 is a view corresponding to Fig. 2 but showing the parts shifted into position for release;

Fig. 4 is a transverse sectional view taken on the line 4—4 of Fig. 2; and

Fig. 5 is a perspective view of the ball-spacer, detached.

The particular embodiment of the present invention herein chosen for purposes of illustration, includes a two part body or casing generally designated by the reference character 10 and comprising a tubular shell 11 and an end-plate 12 located at the front of the said shell 11. For the purpose of rigidly uniting the shell 11 and end-plate 12 into a unitary structure the forward portion of the said shell is beaded over the periphery of the end-plate 12 as is shown at 13 in Figs. 2 and 3 of the drawing.

The end-plate 12 is formed centrally with a rearwardly-extending integral sleeve 14 which terminates about midway the length of the shell 11 so that the rear edge or face of the said sleeve constitutes a rearwardly-facing releasing-abutment 15 for purposes as will hereinafter appear. At its rear the shell 11 is formed with an inwardly-turned stop-flange 16 which is adapted on occasion to be engaged by the forward face of a reversely-bent flange 17 at the forward end of a cup-shaped clutch-carrier generally designated by the reference character 18. The said clutch-carrier 18 extends rearwardly through the aperture in the rear end of the shell 11 defined therein by the inner periphery of the stop-flange 16 of the said shell, as is especially well shown in Figs. 2 and 3.

Rigidly clamped by the reversely-bent flange 17 of the cup-shaped clutch-carrier 18 is the outer portion of an outwardly-extending flange 19 formed at the forward end of a conically-contoured wedging-sleeve 20 located within the clutch-carrier 18 and sloping rearwardly and outwardly from its flange 19.

Reciprocating axially within the ring-like wedging-sleeve 20 above referred to and hence also within the clutch-carrier 18, is a ring-like ball-spacer 21 which is of U-shaped form in cross section and is conically contoured exteriorly to conform to the taper of the interior surface of the wedging-sleeve 20. The interior diameter of the ball-spacer 21 substantially conforms to the internal diameter of the sleeve 14 of the end-plate 12 before described. The ring-like ball-spacer 21 is, as shown, provided with five (more or less) circumferentially-spaced-apart radial ball passages 22, each of which receives one of an annular series of gripping-members 23. The gripping-members 23 just referred to may conveniently be in the form of hardened steel balls, while the remainder of the structure above described may be conveniently formed of sheet steel, sheet brass or other suitable material.

Housed within the hollow clutch-carrier 18 and interposed between the rear face of the ball-spacer 21 and the end wall of the said clutch-carrier, is a helical clutch-operating spring 24 which exerts a constant but yielding effort to force the said ball-spacer 21 forwardly with respect to the clutch-carrier 18. Interposed between the rear face of the end-plate 12 of the body or casing 10 and the forward face of the flange 19 of the wedging-sleeve 20, is a helical clamping-spring 25 as is shown particularly well in Figs. 2 and 3. The said clamping-spring in part encircles the sleeve 14 of the end-plate 12 and exerts a constant but yielding effort to urge the hollow clutch-carrier 18 and the wedging-sleeve 20 rearwardly with respect to the body or casing 10. Preferably and as shown, the clamping-spring 25 is more powerful than the clutch-operating spring 24, though this relationship is not essential but is desirable for the reason that the force required to force the ball-spacer 21 forwardly need not be as great as the force desired to move the entire clutch-carrier 18 and wedging-sleeve 20 rearwardly.

Adapted to be removably entered rearwardly through the front face of the body or casing 10 and through the sleeve 14 thereof and thence through the interior of the ring-like ball-spacer 21 to the interior of the clutch-carrier 18, is the cylindrically-contoured stem 26 of a retaining-member generally designated by the reference character 27 and including also an overhanging head 28.

For purposes of description, let it be assumed that it is desired to retain an automobile license plate such as 29 to a bracket 30 constituting a feature of an automobile or the like. For this purpose the license plate 29 is provided with an aperture 31 and the bracket 30 is provided with an aperture 32, as is shown in the drawing.

One convenient mode of assembling the parts would be to first align the aperture 31 of the license plate 29 with the aperture 32 in the bracket 30 and then rearwardly insert the stem 26 of the retaining-member 27 through both of the said apertures. The unit comprising the body or casing 10, the clutch-carrier 18 and the parts carried thereby will under normal conditions and when separated from the retaining-member 27, have the clutch-carrier 18 held at the limit of its rearward movement with respect to the body 10 under the urge of the clamping-spring 25, as is indicated by broken lines in Fig. 2.

Now by pressing rearwardly upon the retaining-member 27 so as to hold the rear face thereof in substantial engagement with the front face of the license plate 29, the entire unit comprising the parts 10 to 25 inclusive, may now be sleeved over the projecting end of the stem 26 of the said retaining-member until the front face of the body or casing 10 engages with the rear face of the bracket 30. Following the operation last described, rearward pressure should be still maintained upon the retaining-member 27 and further forward force should be applied to the clutch-carrier 18 to compress the clamping-spring 25 until the parts assume substantially the positions in which they are shown in Fig. 2. In this connection, it is to be borne in mind that as the unit comprising the parts 10 to 25 inclusive is applied over the stem 26 as before described, the clutch-operating spring 24 will yield slightly to permit the said stem to penetrate between the balls 23. This yielding, however, will be only sufficient to permit the entry of the said stem, and the said spring acting through the ball-spacer 21 will constantly tend to wedge the balls 23 between the inclined conical inner face of the wedging-sleeve 20 and the periphery of the said stem 26 so as to couple the said stem and the clutch-carrier 18 and the parts carried by the latter against relative movement away from each other in an axial direction. Thus, with the parts in the positions in which they are shown in Fig. 2, the clamping-spring 25 will be compressed and urge the parts carried by the clutch-carrier 18 rearwardly and hence, acting through the gripping-members or balls 23, will draw rearwardly upon the stem 26 of the retaining-member 27. This will result in the tension of the clamping-spring 25 being applied to seat the license plate 29 against the front face of the bracket 30 with sufficient force to prevent rattling and other objectionable effects.

When it is desired to release the retaining-member 27 to permit the removal of the license plate 29, the clutch-carrier 18 and the parts carried thereby should be moved forwardly against the tension of the clamping-spring 25 until they assume substantially the positions in which they are shown in Fig. 3. In the figure referred to it will be noted that the ball-spacer 21 has been moved into engagement with the releasing-abutment 15 at the rear end of the sleeve 14 of the body or casing 10 so that the clutch-operating spring 24 is slightly further compressed and the balls 23 are held out of wedging engagement with the surface of the stem 26 of the said retaining-member 27. With the parts held in the positions shown in Fig. 3, the entire retaining-member 27 may be withdrawn forwardly to free the license plate 29 for removal.

By means of the novel separable fastener of the present invention, an automatic take-up is provided which substantially eliminates vibration of the part or parts to be retained. Furthermore, by virtue of the applied tension, the tendency of vibration to release the clutching action is, for all practical purposes, eliminated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A separable fastener comprising: a hollow body having a retaining-member opening in its front end and a clutch-carrier opening in its rear end; a releasing-abutment projecting rearwardly from the forward portion of the said body into the hollow interior thereof; a clutch-carrier projecting outwardly through the clutch-carrier opening in the rear of the said body and having a portion reciprocating in the latter; clutch-means carried by the said clutch-carrier and constructed and arranged to releasably grip a retaining-member inserted through the retaining-member opening in the front of the said body and positioned for engagement with the said releasing-abutment of the said body when the said clutch-carrier is moved forwardly relative to the said body; spring-means mounted in the said clutch-carrier and urging the said clutch-means forwardly and into clutching engagement with a retaining-member; and a second or clamping-spring within the said body and engaging with the said clutch-carrier to urge the same rearwardly with respect to the said body.

2. A separable fastener comprising: a hollow body having a retaining-member opening in its front end and a clutch-carrier opening in its rear end; a clutch-carrier projecting outwardly through the clutch-carrier opening in the rear of the said body and having a portion reciprocating in the latter, rearwardly-and-outwardly-sloping clutch-operating means located within the said clutch-carrier and carried thereby; a ring-like ball-spacer also mounted within the said clutch-carrier; an annular series of balls carried by the said ball-spacer in position to engage with the said clutch-operating means and with a retaining-member inserted through the retaining-opening in the front of the said body; spring-means mounted in the said clutch-carrier and engaging with the said ball-spacer for urging the same forwardly; and a second or clamping-spring mounted in the said body and engaging with the said clutch-carrier for urging the same rearwardly with respect to the said body.

3. A separable fastener comprising: a hollow body having a retaining-member opening in its front end and a clutch-carrier opening in its rear end, the said body being provided adjacent its rear end with stop-means; a clutch-carrier projecting outwardly through the clutch-carrier opening in the rear of the said body and having a portion reciprocating in the latter and including stop-means engageable with the stop-means of the said body; a conically-contoured clutch-operating sleeve carried by and mounted within the said clutch-carrier and having its surface sloping rearwardly and outwardly with respect to the said body-member; a ring-like ball-spacer mounted within the said clutch-carrier and within the said clutch-operating sleeve; an annular series of balls carried by the said ball-spacer in position to engage with the said clutch-operating sleeve and with a retaining-member inserted through the retaining-member opening in the said body; a spring mounted in the said clutch-carrier and engaging with the said ball-spacer for urging the same forwardly with respect to the said clutch-carrier; and a second or clamping-spring mounted within the said body and engaging with the said clutch-carrier to urge the same rearwardly with respect to the said body.

4. A separable fastener comprising: a hollow body having a retaining-member opening in its front end and a clutch-carrier opening in its rear end, the said body being provided adjacent its rear end with stop-means and adjacent its forward end with a tubular releasing-abutment; a clutch-carrier projecting outwardly through the clutch-carrier opening in the rear of the said body and having a portion reciprocating in the latter and including stop-means engageable with the stop-means of the said body; a conically-contoured clutch-operating sleeve carried by and mounted within the said clutch-carrier and having its surface sloping rearwardly and outwardly with respect to the said body-member; a ring-like ball-spacer mounted within the said clutch-carrier and within the said clutch-operating sleeve; an annular series of balls carried by the said ball-spacer in position to engage with the said clutch-operating sleeve and with a retaining-member inserted through the retaining-member opening in the said body; a spring mounted in the said clutch-carrier and engaging with the said ball-spacer for urging the same forwardly with respect to the said clutch-carrier; and a second or clamping-spring mounted within the said body and engaging with the said clutch-carrier to urge the same rearwardly away from the said tubular releasing abutment.

MARTIN F. McKEON,
*Administrator of the Estate of John L. Vacher, Deceased.*